April 14, 1970     A. J. VAN SANTEN     3,506,301
VEHICULAR SET ACCESSORY FOR CHILDREN
Filed June 14, 1968     2 Sheets-Sheet 1
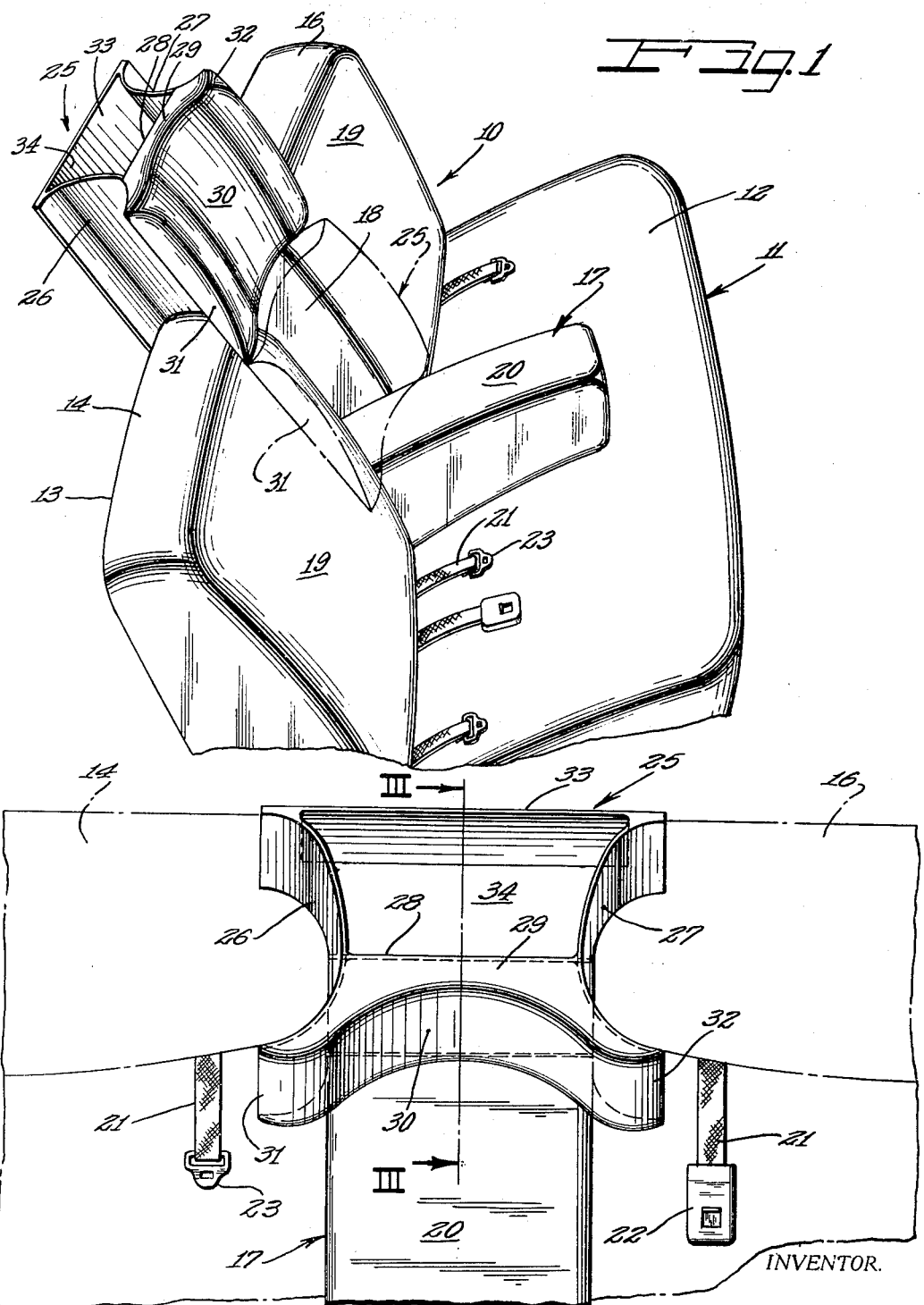
INVENTOR.
Albert J. Van Santen
BY Hill, Sherman, Meroni, Gross & Simpson ATTORNEYS

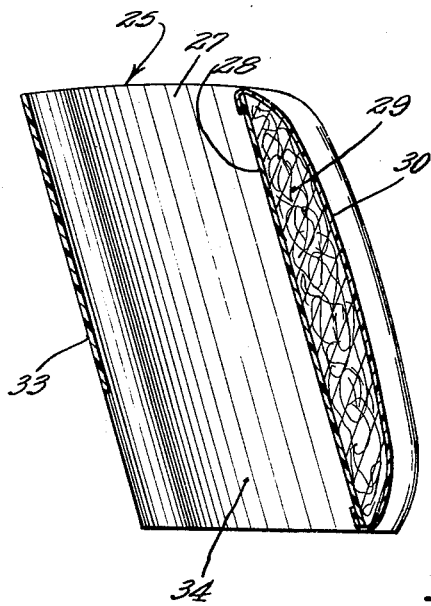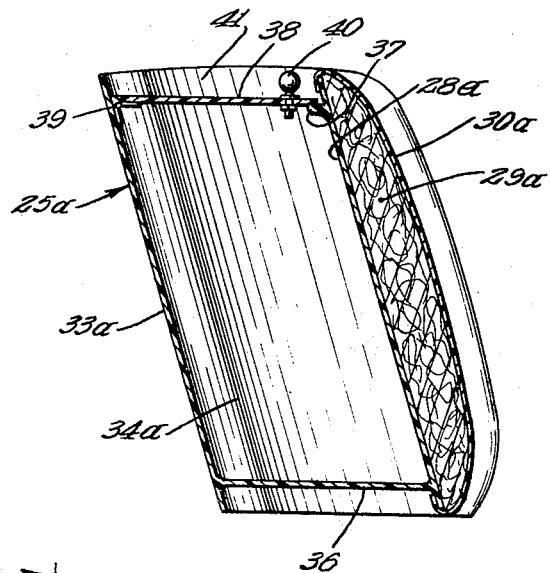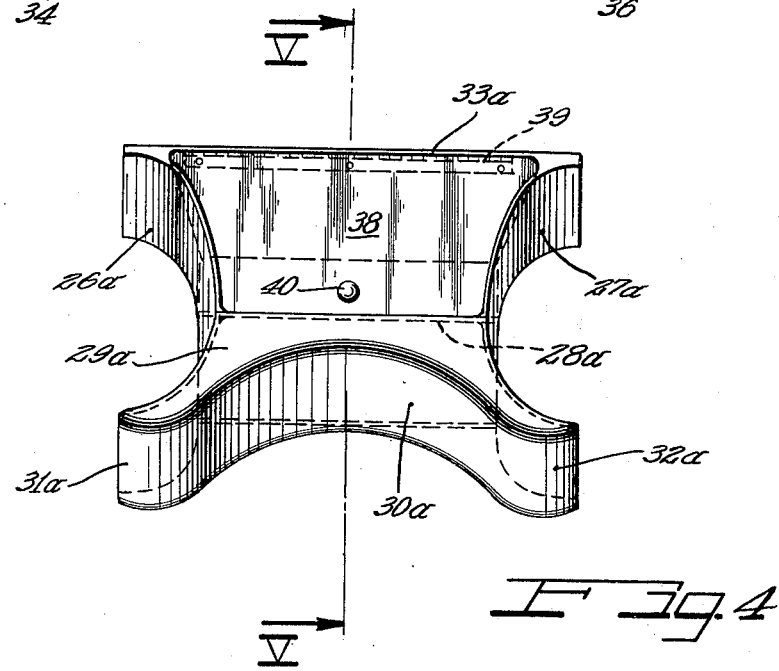

United States Patent Office 3,506,301
Patented Apr. 14, 1970

3,506,301
VEHICULAR SET ACCESSORY FOR CHILDREN
Albert J. Van Santen, 737–41 Hummingbird Way,
North Palm Beach, Fla. 33403
Filed June 14, 1968, Ser. No. 737,105
Int. Cl. A47c *13/00*
U.S. Cl. 297—113                             5 Claims

ABSTRACT OF THE DISCLOSURE

A vehicular seat accessory for children wherein a pivotable armrest is folded to a downward position to form a seat and the accessory part having curvately conforming retainer walls fills the space vacated by the armrest to provide a padded back-supporting surface. Conventional seat belts may be used by the child occupant of the seat. The accessory further provides a storage area which may be uncovered for selective access.

BACKGROUND OF THE INVENTION

Description of the prior art

Vehicular children's seats heretofore provided usually incorporate an integral seat-supporting surface and utilize a structure having various hanging devices engageable with a seat back.

SUMMARY OF THE INVENTION

In accordance with the principles of the present invention, a vehicular seat accessory for children is provided which advantageously exploits existing structural characteristics of an automobile seat assembly. Further, the existing safety features of a seat belt suitable for adult use is readily adaptable for use by a child occupying the seat accessory of the invention. Moreover, a selectively positionable armrest of the type utilized in an automotive seat is utilized in accordance with this invention to provide an elevated seating surface for the child occupant.

More specifically, an accessory is provided consisting of oppositely disposed curvately conformed retainer walls shaped to embrace the seat back at the edges of the opening left upon pivotally displacing a movable armrest to a downward active position.

Extending between the retainer walls is a padded surface forming a back supporting surface shaped to comfortably engage the back of a child seated on the armrest. Additional wall means are provided to rigidify the accessory for structural stability thereof. If desired, the additional wall members may include a hinged cover whereby the hollow space prescribed within the interior of the accessory forms a storage area to which selective access may be gained by opening the cover.

The usual adult seat belt provided in the vehicle may be used to safeguard the child occupying the seat, thereby obviating the necessity of supplying supplemental safety guards specifically adapted for a child.

DESCRIPTION OF THE DRAWINGS

FIGURE 1 is a perspective view showing an automotive seat construction with an accessory provided in accordance with the principles of the present invention in partially assembled position and depicting in dotted lines how the accessory is positioned for utilization.

FIGURE 2 is a plan elevational view of the accessory showing in dash outline the associated components of the automotive seat construction and the safety seat components on opposite sides of the arm rest with which the seat accessory is combined.

FIGURE 3 is a cross-sectional view taken on line III—III of FIGURE 2.

FIGURE 4 is a view similar to FIGURE 2 but omitting the dash outline of the automotive seat and showing a modified embodiment of the seat accessory.

FIGURE 5 is a cross-sectional view taken on line V—V of FIGURE 4.

DESCRIPTION OF THE PREFERRED EMBODIMENTS

Referring to FIGURE 1, an automotive seat construction is shown generally at 10 and comprises a bench type seat 11 providing a generally horizontal support surface 12 as well as a generally upright seat back 13. As is frequently provided in contemporary automotive seat constructions, the seat back 13 may be formed in two separate sections, including a first section 14 and a second section 16 separated by a pivotable armrest shown generally at 17. The armrest is pivotally mounted as an integral part of the seat construction 10 and folds into and out of a space 18 formed between the two seat sections 14 and 16. Thus, the pivotable armrest 17 in a first closed position forms a part of a back supporting surface 19 extending across the entire width of the seat 10 and is pivotally foldable to an active position as shown in FIGURE 1, thereby leaving open the space 18 and providing a generally horizontal support surface 20 which is elevated above the seat supporting surface 12 so that adults sitting in the seat construction 10 may advantageously place their elbows or arms on the surface 20 of the armrest 17.

It will be noted that there is provided in association with the seat construction 10 three separate sets of seat belts suitable for use by three occupants of the seat 10 and including a seat belt shown generally at 21 which includes two separate components disposed on opposite sides of the armrest 17 to include a buckle member 22 which mates with a locking member 23.

In accordance with the principles of the present invention, a vehicular seat accessory for a child is provided to advantageously exploit the existing seat construction 10 as a fully protected seating position for a child. Thus, it is contemplated that the armrest 17 will provide a seat supporting surface 20 on which the child may be seated, it being understood that the feet of the child may be placed on the normal seat supporting surface 12 spaced below the level of the horizontal support surface 20. Because of the provision of the seat belt 21, the straps of the seat belt 21 may be extended so that the buckle 22 and the locking member 23 may be passed over the legs of the child occupying the seat surface 20 and securely fastened so that the child will be fully protected. Accordingly, supplemental child seat belt means need not be provided.

It is further contemplated that a vehicular seat accessory be provided as shown generally at 25. The accessory 25 includes oppositely disposed spaced apart retainer wall members 26 and 27 having a configurative relationship conforming curvately to the seat back sections 14 and 16 such that the walls 26 and 27 form retainer walls to engage and clamp the seat back sections 14 and 16 at the edges of the opening 18.

Extending between the retainer walls 26 and 27 is a front wall 28 which may be upholstered and padded as at 29 to provide a conformably shaped back supporting surface 30 which tapers to a thin cross sectional shape as at 31 and as at 32, thereby to blend in with the normal back supporting surface 19 on each of the seat back sections 14 and 16. Thus, the surface 30 will comfortably engage the back of the child occupant of the seat and it will be noted that when the seat accessory 25 is moved into a fully assembled position as depicted in the dotted lines of FIGURE 1, the back surface 30 will extend uprightly from the generally horizontally disposed surface 20 on the armrest 17.

In order to render the seat accessory 25 structurally stable, additional wall means or wall members may be provided such as a rear wall 33.

When assembled in place, the walls 26, 27, 28, 33 together with the armrest 17 form an enclosed compartment 34 which may be conveniently utilized as a storage compartment.

The form of the invention illustrated in FIGURES 4 and 5 is identical in structural and functional characteristics to that already described in connection with FIGURES 1-3 except that the storage compartment shown at 34a is fully enclosed through the provision of a rear wall 33a and a bottom wall 36. Further, the from wall shown in FIGURE 5 at 28a has a ledge 37 forming a stop for engaging the edge of a door or cover 38 connected by means of a hinge 39 to the rear wall 33a. A manually accessible knob 40 is provided by means of which the cover or door 38 may be selectively opened, thereby affording access to the hollow interior of the accessory 25a. It will be noted that the door or cover 38 is slightly recessed below the level of the top of the accessory 25a thereby providing an open accessible storage area 41 as contrasted with the large closed storage area 34a. Because of the similarities in structure, like reference numerals with the suffix *a* have been applied to like parts shown in FIGURES 4 and 5 but not otherwise described.

Although minor modifications might be suggested by those versed in the art, it should be understood that I wish to embody within the scope of the patent warranted hereon all such modifications as reasonably and properly come within the scope of my contribution to the art.

I claim as my invention:

1. In combination,
   a vehicular seat having a generally horizontal supporting surface, and
   a generally upright back supporting surface,
   a movable armrest in said seat and being selectively pivotally movable from a first position wherein said armrest forms a part of said back supporting surface to a second position wherein said armrest forms a horizontal support surface spaced above said surface of said seat,
   said armrest leaving an opening in said back supporting surface when in said second position,
   an accessory part comprising
   oppositely disposed spaced apart retainer walls having a configuration shaped to conformably embrace said seat at the edges of said opening in said back supporting surface,
   a padded wall extending between said retainer walls and forming a bridging back supporting surface for a child sitting on said horizontal surface of said armrest, and
   additional wall means rigidifying said accessory part to impart structural stability thereto.

2. In the combination as defined in claim 1, said additional wall means together with said retainer walls and said padded wall forming a storage compartment.

3. In the combination as defined in claim 2, said additional wall means including a cover hingedly connected to afford selective access to said storage compartment.

4. In the combination of claim 1, seat belt means including first and second seat belt components on opposite sides of said armrest and extendable over the legs of a child sitting on said armrest, said seat belt means including locking means for securing the child in place.

5. For use in combination with a vehicular seat having
   a generally horizontal supporting surface and an upright back supporting surface with a movable armrest selectively movable from a closed position wherein said armrest forms a part of the back supporting surface to an open position wherein said armrest forms a horizontal support surface spaced above the surface of the seat,
   an accessory having oppositely disposed spaced apart retainer walls shaped to a configuration conforming to the seat at the edges of the opening in the back supporting surface left by movement of the armrest and being insertable into said opening,
   a front wall extending between said retainer walls and bridging the space between the separated sections of the back supporting surface, and
   a rear wall extending between the retainer walls and together with the front wall and the retainer walls forming a storage compartment.

References Cited

UNITED STATES PATENTS

| | | | |
|---|---|---|---|
| 2,436,294 | 2/1948 | Glatstein | 297—113 X |
| 2,584,481 | 2/1952 | Mast et al. | 297—113 X |
| 2,710,049 | 6/1955 | Potocnik | 297—113 |
| 2,714,419 | 8/1955 | Killington | 297—113 |
| 2,966,201 | 12/1960 | Strahler | 297—385 X |

JAMES T. McCALL, Primary Examiner

U.S. Cl. X.R.

297—385